April 6, 1926.　　　　　K. KLEVEN　　　　　1,579,621
FENDER BRACE AND BUMPER
Filed August 14, 1925
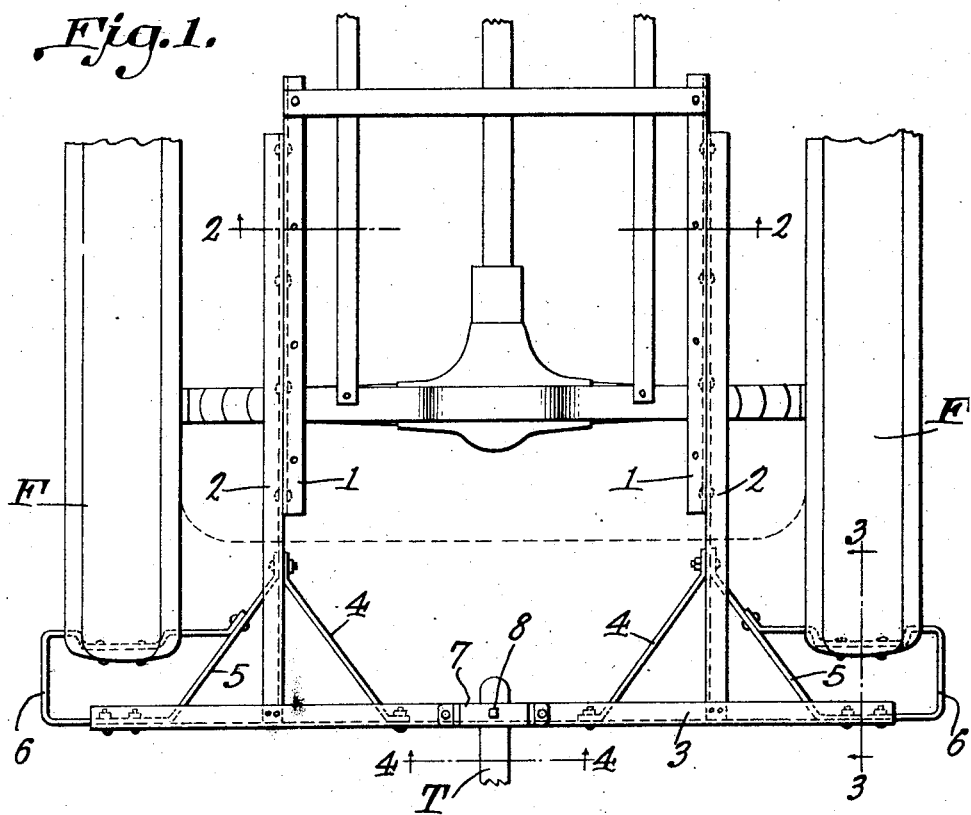
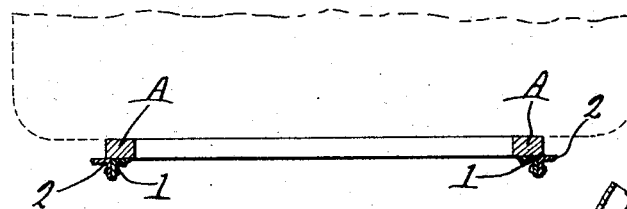
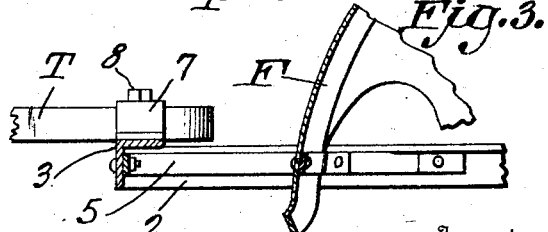
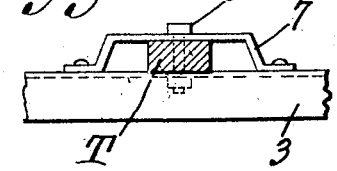
Inventor
Knut Kleven
By C. A. Snow & Co.
Attorneys Patented Apr. 6, 1926.

1,579,621

UNITED STATES PATENT OFFICE.

KNUT KLEVEN, OF MINNEAPOLIS, MINNESOTA, ASSIGNOR OF ONE-HALF TO GILBERT KLEVEN, OF MOUNT HOREB, WISCONSIN.

FENDER BRACE AND BUMPER.

Application filed August 14, 1925. Serial No. 50,300.

*To all whom it may concern:*

Be it known that I, KNUT KLEVEN, a citizen of the United States, residing at Minneapolis, in the county of Hennepin and State of Minnesota, have invented a new and useful Fender Brace and Bumper, of which the following is a specification.

This invention relates to a combined bumper and fender brace for use in connection with automobiles, one of the objects being to provide a simple form of brace carried by the ends of a bumper and which serves not only to support the adjacent fender but also acts as a side guard to prevent the bumper from being side swiped.

With the foregoing and other objects in view which will appear as the description proceeds the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings,

Figure 1 is a plan view of a portion of an automobile having the present improvements combined therewith.

Figure 2 is a section on line 2—2 Figure 1.

Figure 3 is a section on line 3—3 Figure 1.

Figure 4 is a section on line 4—4 Figure 1.

Referring to the figures by characters of reference A designates a portion of the frame of an automobile and to the bottom of the sides thereof are secured angle strips 1 constituting attaching means. To these angle strips are riveted or otherwise attached the angle bars 2 which are extended from the cross member 3 of the bumper, this cross member being in the form of an angle strip. Brace strips 4 are secured to the bars 2 and the cross member 3 and additional brace strips 5 are attached to said members. These strips 5 are bolted or otherwise attached to the end portions of the cross member 3 and each is extended laterally and rearwardly therefrom as shown at 6 to constitute a side guard. The strip is then extended inwardly under one of the fenders F of the automobile to which it is bolted or otherwise fastened and the terminal of this inwardly extended portion is riveted or otherwise attached to the brace 5 at a point adjacent the bar 2. That portion of the guard extending across the fender is so shaped as to fit snugly thereagainst.

It will be apparent that when this device is in position it not only acts as a bumper but also serves to support the fenders and prevent them from being side swiped. The parts 5—6 can be applied readily to the bumper structure and can be removed and replaced at will.

If desired a bracket 7 can be bolted or otherwise attached to the middle portion of the bumper for the reception of a coupling pin 8 whereby tongue T of a trailer can be coupled to the bumper.

What is claimed is:

1. A fender brace for automobiles including a transverse member, means for attaching the same to the frame of an automobile, said member constituting a bumper, braces connecting said transverse member to the attaching means, and a combined guard and fender support integral with each of said braces and extending laterally and forwardly relative to the transverse member.

2. A fender brace for automobiles including a transverse member, bars for connecting the same to the frame of an automobile, said member constituting a bumper, braces connecting said bars to the transverse member, means extending laterally and forwardly from each of the braces and beyond the transverse member for constituting a side guard and an inwardly extending portion connecting each side guard to the brace and constituting a fender support.

3. A fender brace for automobiles including a transverse member, bars for connecting the same to the frame of an automobile, said member constituting a bumper, braces connecting said bars to the transverse member, means extending laterally and forwardly from each of the braces and beyond the transverse member constituting a side guard and an inwardly extending portion connecting each side guard to the brace and constituting a fender support, said brace and its laterally extending portion being detachably connected to the transverse member, bar and fender respectively.

4. The combination with an automobile frame, of an angle strip secured to each side portion thereof, angle bars secured to the angle strips and extended therebeyond, a transverse member secured to and extending laterally beyond the bars, rearwardly diverging braces detachably connected to the bar and the end portions of the transverse member, laterally extending portions integral with the braces and projecting laterally beyond the ends of the transverse member to constitute side guards, and means extending inwardly from said side guards and connected to the braces for detachably supporting the fenders of the automobile.

In testimony that I claim the foregoing as my own, I have hereto affixed my signature.

KNUT KLEVEN.